US012752505B2

(12) United States Patent
Yamamuro et al.

(10) Patent No.: US 12,752,505 B2
(45) Date of Patent: Oct. 6, 2026

(54) GUIDE POSITION ADJUSTMENT DEVICE, FOLDER GLUER AND BOX MAKING MACHINE, AND FOLDING GUIDE POSITION ADJUSTMENT METHOD

(71) Applicant: MITSUBISHI HEAVY INDUSTRIES MACHINERY SYSTEMS, LTD., Kobe (JP)

(72) Inventors: Kunihiko Yamamuro, Kobe (JP); Makoto Shimohatsubo, Kobe (JP); Kazuhisa Takemoto, Kobe (JP); Kazuya Sugimoto, Kobe (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 118 days.

(21) Appl. No.: 18/277,137

(22) PCT Filed: Feb. 18, 2022

(86) PCT No.: PCT/JP2022/006794

§ 371 (c)(1),
(2) Date: Aug. 14, 2023

(87) PCT Pub. No.: WO2022/176995

PCT Pub. Date: Aug. 25, 2022

(65) Prior Publication Data

US 2024/0092048 A1 Mar. 21, 2024

(30) Foreign Application Priority Data

Feb. 22, 2021 (JP) ................................ 2021-026062

(51) Int. Cl.
*B31B 50/36* (2017.01)
*B31B 50/04* (2017.01)
*B31B 50/62* (2017.01)

(52) U.S. Cl.
CPC ............ *B31B 50/36* (2017.08); *B31B 50/046* (2017.08); *B31B 50/624* (2017.08)

(58) Field of Classification Search
CPC ..... B31B 50/36; B31B 50/046; B31B 50/624; B31B 50/46; B31B 50/48; B31B 50/50;
(Continued)

(56) References Cited

U.S. PATENT DOCUMENTS 4,121,506 A 10/1978 Van Grouw
2016/0243784 A1 8/2016 Ishizuka et al.
(Continued)

FOREIGN PATENT DOCUMENTS

CN 209005433 U 6/2019
CN 212470667 U 2/2021
(Continued)

OTHER PUBLICATIONS

Extended European Search Report of European Application No. 22756312.9 dated Aug. 1, 2024, 9 pp.
(Continued)

*Primary Examiner* — Sameh Tawfik
(74) *Attorney, Agent, or Firm* — HAUPTMAN HAM, LLP

(57) ABSTRACT

A guide position adjustment device includes upstream side guide members and downstream side guide members arranged in order starting from the upstream side in the sheet traveling direction. Each of the upstream side guide members and each of the downstream side guide members are mounted in pairs on the right and left sides of a folder gluer. The guide position adjustment device includes an outlet side guide moving mechanism, which is mounted on a folding guide device provided with a frame moving mechanism for translating, by a first actuator, a supporting frame that supports the upstream side guide members and the down-
(Continued)

stream side guide members, in the device width direction perpendicular to the sheet traveling direction. The outlet side guide moving mechanism moves, by a second actuator, an outlet side tip end regulation part of the upstream side guide members relative to the supporting frame in the device width direction.

9 Claims, 9 Drawing Sheets

(58) Field of Classification Search
CPC ......... B31B 50/60; B31B 70/02; B31B 70/04; B31B 70/26; B31B 70/36
USPC .......................................................... 493/438
See application file for complete search history.

(56) References Cited

U.S. PATENT DOCUMENTS

| | | | | |
|---|---|---|---|---|
| 2020/0171776 A1* | 6/2020 | Akita | ...................... | B31B 50/88 |
| 2020/0282683 A1* | 9/2020 | Akita | ...................... | B31B 50/88 |

FOREIGN PATENT DOCUMENTS

| | | | |
|---|---|---|---|
| JP | 2007185799 | A | 7/2007 |
| JP | 4609809 | B2 | 1/2011 |
| JP | 4701062 | B2 | 6/2011 |
| JP | 5895316 | B1 | 3/2016 |
| JP | 2018-065321 | A | 4/2018 |
| WO | 2019/064391 | A1 | 4/2019 |

OTHER PUBLICATIONS

PCT/ISA/210, “International Search Report for PCT International Application No. PCT/JP2022/006794,” Mar. 22, 2022.
PCT/IB/373 and PCT/ISA/237, “International Preliminary Report on Patentability with Written Opinion for PCT International Application No. PCT/JP2022/006794,” Aug. 22, 2023.
Japan Patent Office, “Office Action for Japanese Patent Application 2021-026062,” Sep. 5, 2023.
Japan Patent Office, “Decision of Refusal for JP Application No. 2021-026062”, Feb. 20, 2024, 4pp.
China Patent Office, The First Office Action for Chinese Patent Application No. 202280014995.X dated Jul. 9, 2025; 20 pp.

* cited by examiner

GUIDE POSITION ADJUSTMENT DEVICE, FOLDER GLUER AND BOX MAKING MACHINE, AND FOLDING GUIDE POSITION ADJUSTMENT METHOD

RELATED APPLICATIONS

The present application is National Phase of International Application No. PCT/JP2022/006794 filed Feb. 18, 2022, and claims priority from Japanese Application No. 2021-026062, filed Feb. 22, 2021, the disclosure of which is hereby incorporated by reference herein in its entirety.

TECHNICAL FIELD

The present invention relates to a guide position adjustment device that is mounted on a folder gluer provided in a box making machine to fold a corrugated cardboard sheet into a box, the folder gluer, the box making machine, and a folding guide position adjustment method.

BACKGROUND ART

A box making machine is equipped with a corrugated cardboard sheet folding device called a folder gluer. A prior art of the folder gluer will be described with reference to FIG. 9.

FIG. 9 is a perspective view for explaining the outline of the folder gluer, and as shown in FIG. 9, a corrugated cardboard sheet 1 is processed with a creasing line C or a slot S by an upstream slotter creaser part (not shown) and folded by the folder gluer into a box (a corrugated cardboard box). In FIG. 9, creasing lines that are folded by the folder gluer are indicated by dashed lines C1 and C2.

The folder gluer is provided with right and left upper frames 2 along a sheet advancing direction, and a pulley 3 is provided at each of the inlet and outlet of the upper frame 2 (the pulley on the outlet side is not shown), and a conveying belt 4 is hung between the pulley 3 at the inlet and the pulley 3 at the outlet. Right and left lower frames 5 are provided below the right and left conveying belts 4, and each conveying belt 4 travels on the upper surface of the corresponding lower frame 5.

The corrugated cardboard sheet 1 is fed between the conveying belt 4 and the lower frame 5 after glue is applied to a seam allowance portion formed on either one of right and left panels. Then, the corrugated cardboard sheet 1 is held on the conveying belt 4 by the frictional force of the conveying belt 4 and slides and moves on the upper surface of the lower frame 5. Alternatively, the corrugated cardboard sheet 1 is moved while being sandwiched and held between a conveying belt (not shown) stretched along a traveling path above the lower frame 5 and the conveying belt 4 described above. The lower frame 5 is located inside each of the creasing lines C1 and C2 for folding (near the center of the machine). A folding ruler 6 is provided to be supported on the lower frame 5 along the traveling path of the corrugated cardboard sheet 1. A folding bar 7 is provided outside the traveling path of the corrugated cardboard sheet 1 to follow the traveling path.

The corrugated cardboard sheet 1 is pressed and folded by the folding bar 7 while a folding position is accurately regulated by a tip regulation portion of the folding ruler 6 in the traveling process. When the corrugated cardboard sheet 1 travels to a downstream portion and a folding angle becomes close to 180°, the corrugated cardboard sheet 1 is further folded by a folding belt 8. Thereafter, the seam allowance portion of one of the right and left panels and the other of the right and left panels are joined together by glue, whereby a box is completed.

When the corrugated cardboard sheet is not folded by the folder gluer at an appropriate folding position, box accuracy may become poor.

PTL 1 discloses a technique provided with an adjustment mechanism for finely adjusting the laterally inclined state of the tip regulation portion that guides the corrugated cardboard sheet, by moving the main part of the folding ruler 6, which is fixed to the lower frame in the related art, in a device width direction.

In this technique, as shown in FIG. 10, the folding ruler (hereinafter referred to as a "folding guide") 6 is divided into an inlet-side ruler (hereinafter referred to as a "first folding guide") 11, an outlet-side ruler (hereinafter referred to as a "third folding guide") 13, and an intermediate ruler (hereinafter referred to as a "second folding guide") 12, in which the first folding guide 11 is made to translate in the device width direction with respect to the lower frame, the third folding guide 13 is disposed at a position shifted inward in the device width direction with respect to the first folding guide 11 and fixed to the lower frame 5, and the second folding guide 12 is set such that both ends thereof are connected to the folding guides 11 and 13 by pins so as to gently connect the tip regulation portions of the folding guides 11 and 13.

The corrugated cardboard sheet 1 is folded along the creasing lines mainly in the process of passing through the second folding guide 12. However, in this folding process, the right and left second folding guides 12 are disposed to be laterally inclined such that the positions of the tip regulation portions thereof are gradually shifted inward in the device width direction as it goes toward the downstream side in the moving direction of the corrugated cardboard sheet, so as to correspond to gradual movement inward in the device width direction of the position of the creasing line on the inner surface side of the folded portion of the corrugated cardboard sheet 1.

It is described that according to this technique, it becomes possible to precisely align the tip regulation portion with the creasing line inside the folded portion of the corrugated cardboard sheet, it is possible to obtain high folding accuracy of the corrugated cardboard sheet, and the manufacturing accuracy of the corrugated cardboard box can be improved.

Further, PTL 2 discloses a technique in which a detection device for detecting the passage of a corrugated cardboard sheet is disposed upstream of a folding plate disposed in the front half area where the corrugated cardboard sheet is folded from 0 degrees to approximately 90 degrees, and when the detection device detects the passage of the corrugated cardboard sheet, the folding plate is temporarily pushed and moved outward by a predetermined distance in the width direction by pressing means, so that a downstream portion of the folded panel of the corrugated cardboard sheet is expanded in the width direction. It is described that in this way, in the first half process of folding the corrugated cardboard sheet, a state where the folding lines of two panels on both sides of the corrugated cardboard sheet are not tilted is created, and in the second half process, the two panels are continued to be folded, whereby a box without fishtails can be produced.

CITATION LIST

Patent Literature

[PTL 1] Japanese Patent No. 4609809
[PTL 2] Japanese Patent No. 5895316

SUMMARY OF INVENTION

Technical Problem

Incidentally, in recent years, a manufacturing method called 2-up production, in which two boxes arranged back and forth in a sheet conveying direction are manufactured from one corrugated cardboard sheet, has been increased. In this case, since the sheet passes in a form in which the sheets are connected back and forth, an apparent box depth in the sheet becomes deep.

Further, as shown in FIG. 10, the third folding guide 13 includes a first guide plate 13A and a second guide plate 13B in order from the upstream side, and the downstream-side half of the second guide plate 13B is disposed to be laterally inclined such that the position of the tip regulation portion is gradually shifted inward in the device width direction toward the downstream.

Therefore, for example, when the folding progresses with the tip (a front end portion in the sheet conveying direction) of the corrugated cardboard sheet 1 as a reference, in a sheet with a deep box depth, even if the tip of the corrugated cardboard sheet properly comes into contact with the downstream-side half of the second guide plate 13B, the rear end side of the corrugated cardboard sheet 1 embraces the first guide plate 13A or the upstream-side half of the second guide plate 13B, and it becomes a factor of destabilizing folding accuracy.

In order to solve this problem, it is conceivable to move the third folding guide 13 (the first guide plate 13A and the second guide plate 13B) inward in the device width direction with respect to the lower frame 5. However, since the corrugated cardboard sheet 1 is folded at an angle of 90° or larger at the portion of the third folding guide 13, it is not possible to secure a space for installing a mechanism for moving the third folding guide 13, and this countermeasure is difficult to be implemented.

In contrast, for example, if the entire third folding guide 13 (the first guide plate 13A and the second guide plate 13B) is moved inward in the device width direction by moving the lower frame supporting the third folding guide 13 inward in the device width direction independent of the lower frame supporting the first and second folding guides 11 and 12, it is possible to prevent the rear end side of the corrugated cardboard sheet from embracing the first guide plate 13A or the upstream-side half of the second guide plate 13B.

However, since the front end of the second folding guide 12 is connected to the rear end of the third folding guide 13 (the rear end of the first guide plate 13A) with a pin, if the third folding guide 13 is moved, the front end of the second folding guide 12, that is, the outlet of the second folding guide 12 also moves inward in the device width direction.

As described above, since the corrugated cardboard sheet 1 is folded along the creasing lines mainly in the process of passing through the second folding guide 12, the outlet of the second folding guide 12 is also an important portion for determining the folding position. Therefore, if the outlet of the second folding guide 12 moves inward in the device width direction, it rather becomes a factor of destabilizing folding accuracy.

Further, as described above, the corrugated cardboard sheet 1 is folded along the creasing lines in the process of passing through the second folding guide 12. However, in this folding process, the position of the creasing line on the inner surface side of the folded portion of the corrugated cardboard sheet 1 gradually moves inward in the device width direction. In the invention of PTL 2, the downstream portions of the first panel and the fourth panel are expanded in the width direction by pushing and moving the folding member by the pushing means by a predetermined distance outward in the width direction so as to oppose this behavior. Therefore, the pushing means applies unnatural pressure to the corrugated cardboard sheet 1, and there is a possibility that conveyance resistance may occur in the corrugated cardboard sheet 1.

The present invention has been made with a focus on such problems, and has an object to provide a guide position adjustment device which is mounted on a folder gluer and in which it is possible to secure folding accuracy even for a corrugated cardboard sheet with a deep box depth (including an apparent box depth), a folder gluer provided with the guide position adjustment device, a box making machine provided with the folder gluer, and a folding guide position adjustment method.

Solution to Problem

A guide position adjustment device of the present case is a guide position adjustment device including: an upstream-side guide member and a downstream-side guide member which are mounted in pairs to right and left on a folder gluer that folds a corrugated cardboard sheet into a box while the corrugated cardboard sheet travels in a sheet traveling direction, and which are disposed in order from an upstream side in the sheet traveling direction, in which the guide position adjustment device is mounted on a folding guide device provided with a frame moving mechanism for translating a supporting frame, which supports the upstream-side guide member and the downstream-side guide member, in a device width direction perpendicular to the sheet traveling direction by a first actuator, the upstream-side guide member includes at least an inlet-side tip regulation portion and an outlet-side tip regulation portion of the upstream-side guide member, among tip regulation portions that come into contact with a folded portion of the corrugated cardboard sheet, and the guide position adjustment device includes an outlet-side guide moving mechanism for moving the outlet-side tip regulation portion in the device width direction with respect to the supporting frame in an inner range from a position in the device width direction of the inlet-side tip regulation portion by a second actuator.

A folder gluer of the present case includes the guide position adjustment device described above.

A box making machine of the present case includes the folder gluer described above.

A folding guide position adjustment method of the present case is a folding guide position adjustment method for adjusting positions in a device width direction of an upstream-side guide member and a downstream-side guide member by a guide position adjustment device which is the guide position adjustment device described above and further includes an inlet-side guide moving mechanism for moving the inlet-side tip regulation portion of the upstream-side guide member in the device width direction by a third actuator, the method including: in a case where a length in a traveling direction of the corrugated cardboard sheet is equal to or greater than a predetermined value set in advance, translating a supporting frame inward in the device width direction by operating a first actuator and moving at least the inlet-side tip regulation portion of the upstream-side guide member outward in the device width direction by operating a third actuator, with respect to a case where the length in a traveling direction is smaller than the predetermined value, and thereafter, moving the outlet-side tip regulation portion outward in the device width direction in an inner range from a position in the device width direction of the inlet-side tip regulation portion by operating the second actuator.

Advantageous Effects of Invention

According to the present case, it becomes possible to precisely align the tip regulation portion that guides the corrugated cardboard sheet with a creasing line inside a folded portion (that is, a panel) of the corrugated cardboard sheet, it is possible to easily and reliably obtain high folding accuracy of the corrugated cardboard sheet, and the manufacturing accuracy of the corrugated cardboard box can be greatly improved.

BRIEF DESCRIPTION OF DRAWINGS

FIGS. 1A and 1B are top views showing a main part of a folder gluer according to an embodiment of the present invention, in which FIG. 1A shows the embodiment and FIG. 1B shows a partial modification example of the embodiment.

FIGS. 4A, 4B, 4C, and 4D are diagrams showing a main part of the guide position adjustment device according to the embodiment of the present invention, in which FIG. 4A is a plan view thereof, FIG. 4B is a transverse sectional view of a main part thereof (a sectional view taken along line B-B in FIG. 4A and viewed in a direction of an arrow), FIG. 4C is a configuration diagram of a main part of a moving direction conversion mechanism (a sectional view taken along line C-C in FIG. 4A and viewed in a direction of an arrow), and FIG. 4D a main part plan view showing a modification example of a part thereof.

FIGS. 5A, 5B, and 5C are plan views of the main part of the folder gluer showing the operation of the guide position adjustment device according to the embodiment of the present invention, in which FIG. 5A shows the state before a position adjustment, FIG. 5B shows the state after a supporting frame has been moved by a frame moving mechanism, and FIG. 5C shows the state after a second guide member has been moved by an outlet-side guide moving mechanism.

FIGS. 6A, 6B, 6C, and 6D are plan views and sectional views of a main part according to a comparative example of the folding guide device for explaining the effect of the embodiment of the present invention, in which FIG. 6A is a plan view of the main part in a case of manufacturing a corrugated cardboard sheet short in a traveling direction, FIG. 6B is a sectional view of the main parts in a case of manufacturing the corrugated cardboard sheet short in the traveling direction (a sectional view taken along line D-D in FIG. 6A and viewed in a direction of an arrow), FIG. 6C is a plan view of the main part in a case of manufacturing a corrugated cardboard sheet long in the traveling direction, and FIG. 6D is a sectional view of the main parts in a case of manufacturing the corrugated cardboard sheet long in the traveling direction (a sectional view taken along line E-E in FIG. 6C and viewed in a direction of an arrow).

FIGS. 7A, 7B, 7C, and 7D are plan views and sectional views of the main part of the folding guide device for explaining the effect of the embodiment of the present invention, in which FIG. 7A is a plan view of the main part in a case of manufacturing a corrugated cardboard sheet short in the traveling direction, FIG. 7B is a sectional view of the main parts in a case of manufacturing the corrugated cardboard sheet short in the traveling direction (a sectional view taken along line F-F in FIG. 7A and viewed in a direction of an arrow), FIG. 7C is a plan view of the main part in a case of manufacturing a corrugated cardboard sheet long in the traveling direction, and FIG. 7D is a sectional view of the main parts in a case of manufacturing the corrugated cardboard sheet long in the traveling direction (a sectional view taken along line G-G in FIG. 7C and viewed in a direction of an arrow).

FIGS. 8A, 8B, 8C, 8D, and 8E are plan views of the main parts of modification examples of the guide position adjustment device according to the embodiment of the present invention, in which FIG. 8A shows a first modification example, FIG. 8B shows a second modification example, FIG. 8C shows a third modification example, FIG. 8D shows a fourth modification example, and FIG. 8E shows a main part plan view showing a partial modification example of the third and fourth modification examples.

DESCRIPTION OF EMBODIMENTS

Hereinafter, an embodiment of the present invention will be described with reference to the drawings.

Figure 1A:
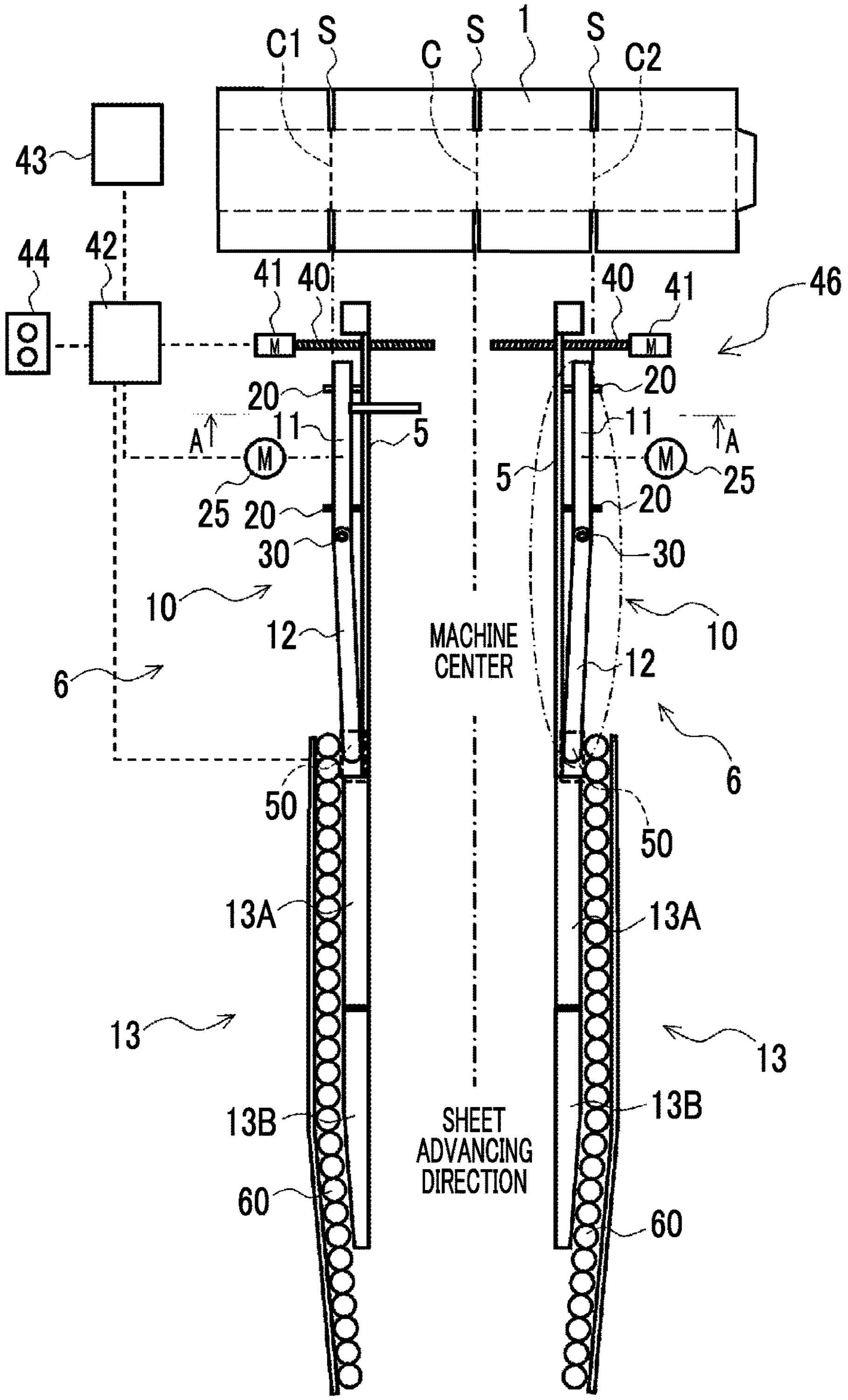
Figure 1B:
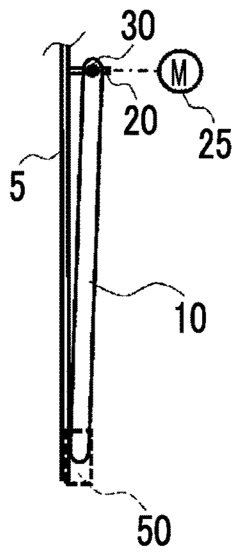
Figure 2:
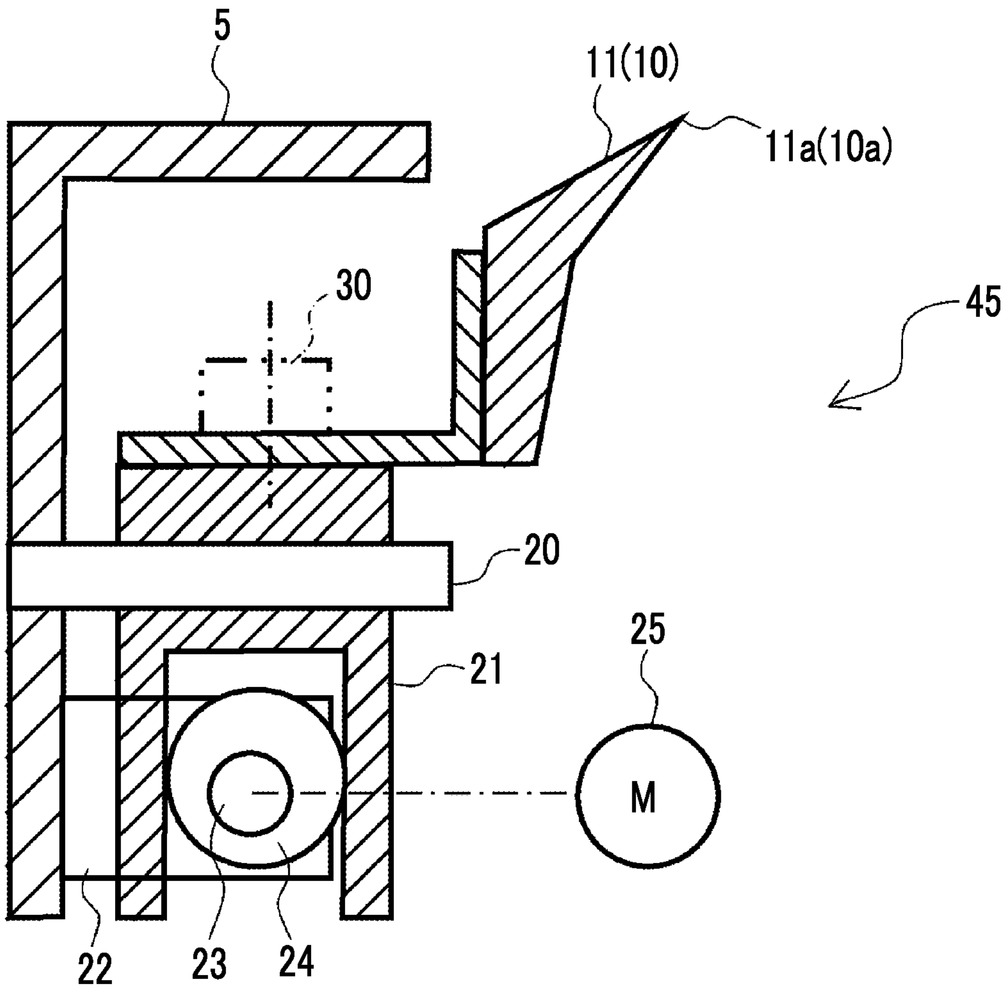
FIG. 2 is a transverse sectional view (sectional view taken along line A-A in FIG. 1A and viewed in a direction of an arrow) of a first folding guide (a first guide member) of a guide position adjustment device according to an embodiment of the present invention.
Figure 3A:
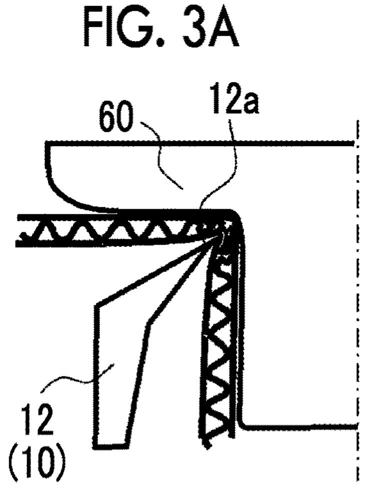
FIGS. 3A, 3B, and 3C are transverse sectional views showing, in order of FIG. 3A, FIG. 3B, and FIG. 3C, a state where a corrugated cardboard sheet is folded by a guide member and a gauge roller of the guide position adjustment device according to the embodiment of the present invention.
Figure 3B:
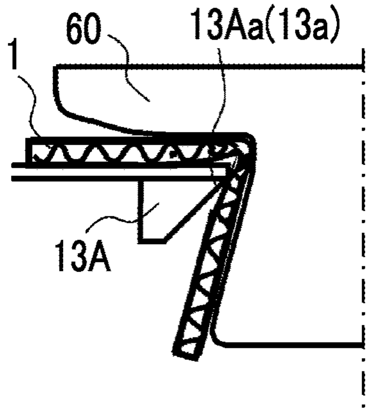
Figure 3C:
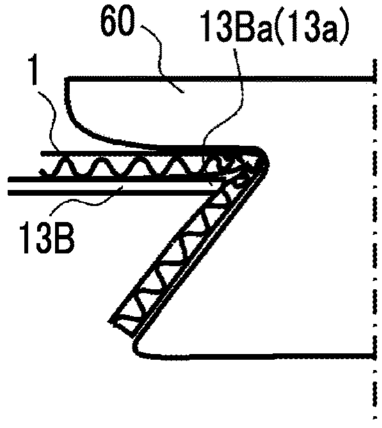

FIG. 1 (FIGS. 1A and 1B) to FIG. 3 (FIGS. 3A, 3B, and 3C) show a main part of a folder gluer according to an embodiment of the present invention, in which FIG. 1A is a plan view thereof, FIG. 2 is a transverse sectional view of a first guide member thereof, and FIG. 3 is a diagram showing a main part of a guide position adjustment device thereof.

Figure 9:
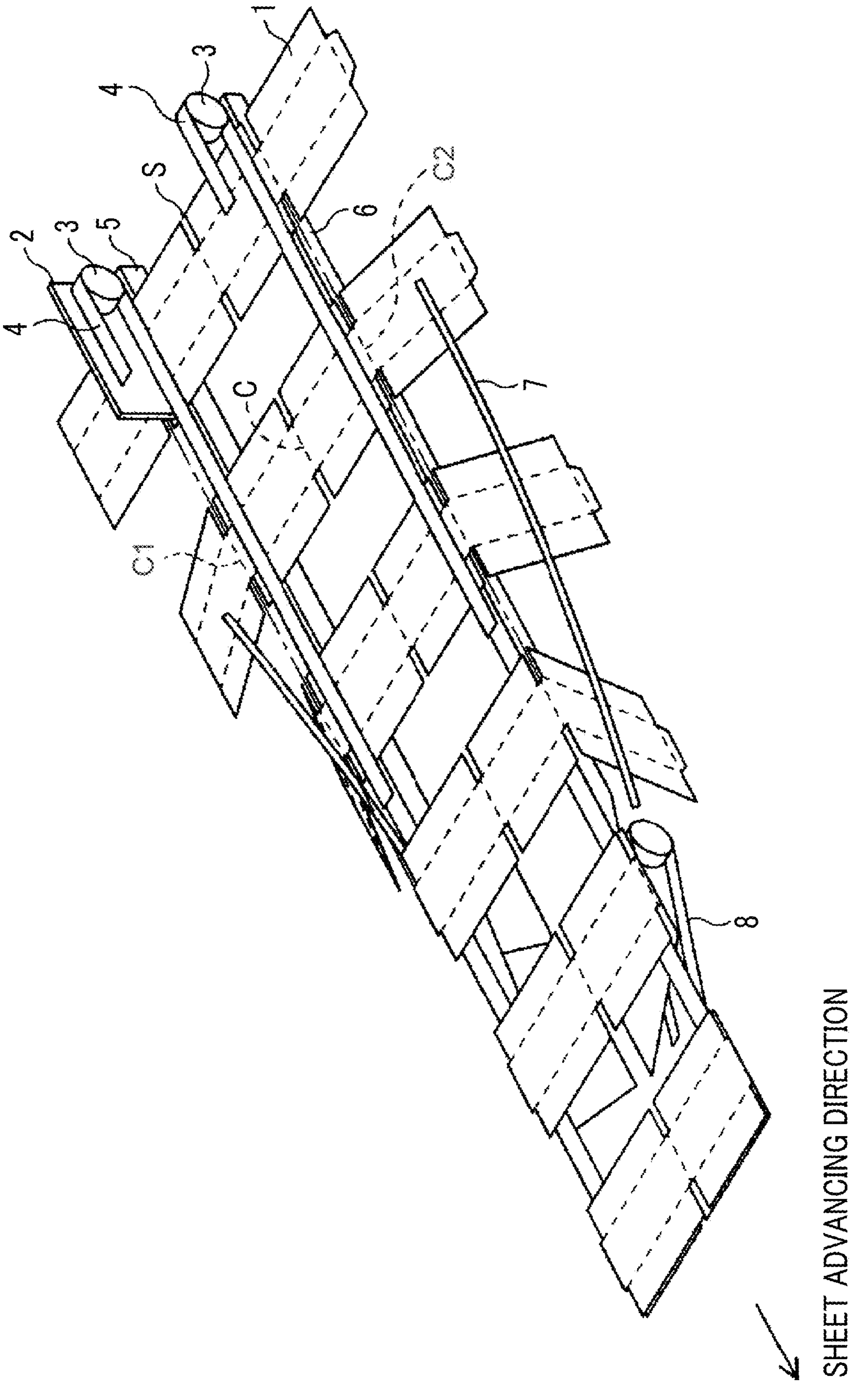
FIG. 9 is a perspective view showing a folder gluer according to the background art.
Figure 10:
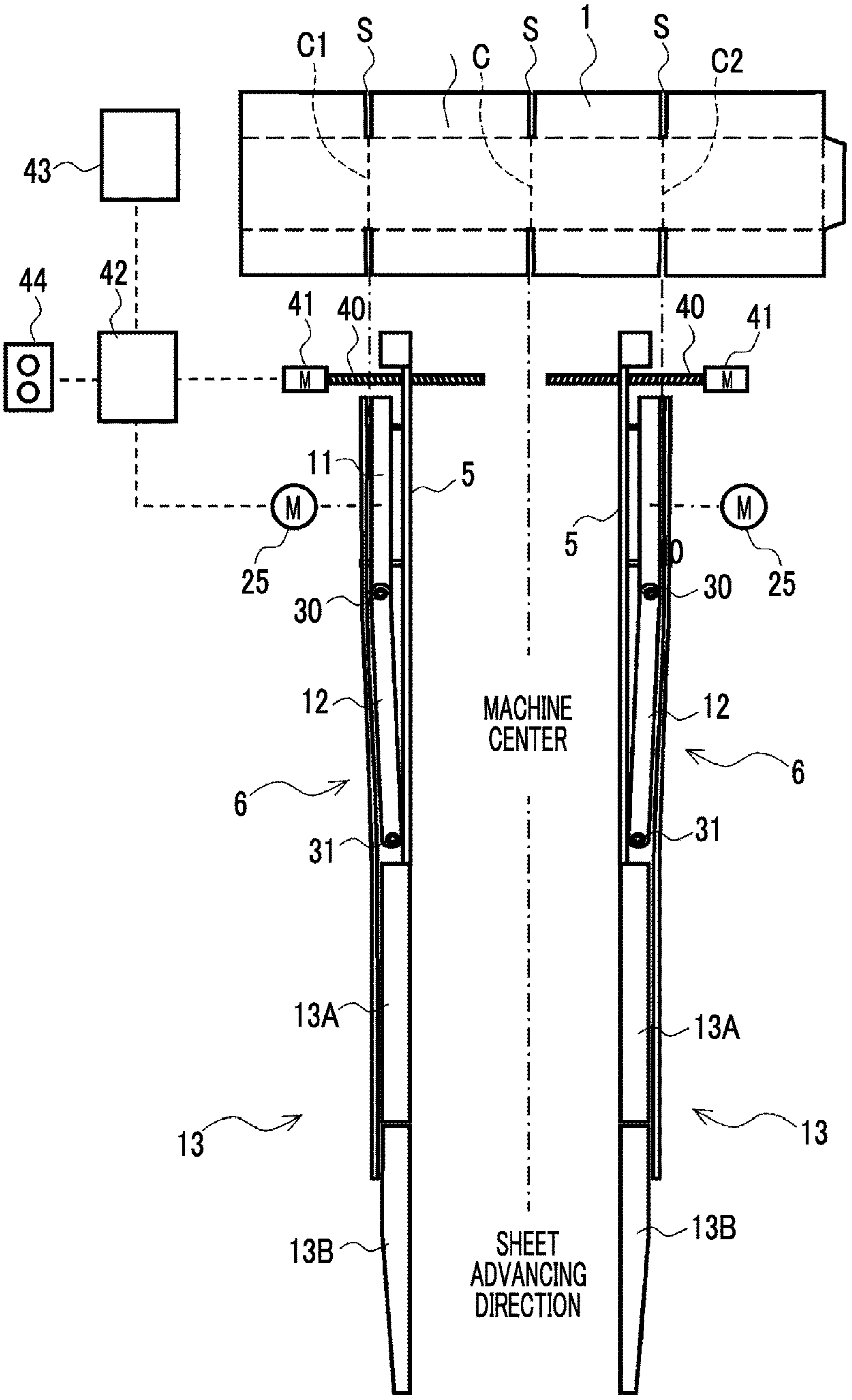
FIG. 10 is a top view showing a disposition configuration of a folding guide (a folding ruler) of the folder gluer according to the background art.

The folder gluer of the present embodiment is provided in a box making machine, and a general configuration thereof is the same as that of the related art except for a guide position adjustment device and its periphery. That is, referring to FIG. 9, the folder gluer that is provided in the box making machine is provided with right and left upper frames 2 along a sheet advancing direction, and a pulley 3 is provided at each of an inlet and an outlet of each of the upper frames 2 (illustration of the outlet side is omitted), and a conveying belt 4 is hung between the pulley 3 at the inlet and the pulley 3 at the outlet. Right and left lower frames (supporting frames) 5 are similarly provided below the right and left conveying belts 4, and each conveying belt 4 travels on the upper surface of the corresponding lower frame 5. A corrugated cardboard sheet 1 is fed between the conveying belt 4 and the lower frame 5, held on the conveying belt 4 by the frictional force of the conveying belt 4, and slides and moves on the upper surface of the lower frame 5. Alternatively, the corrugated cardboard sheet 1 is moved while being sandwiched and held between a conveying belt (not shown) stretched along a traveling path above the lower frame 5 and the conveying belt 4 described above. The lower frame 5 is located inside each of the creasing lines C1 and C2 for folding (near the center of the machine).

A folding guide 6 is provided to be supported on the lower frame 5 along the traveling path of the corrugated cardboard sheet 1. A folding bar 7 is provided outside the traveling path of the corrugated cardboard sheet 1 to follow the traveling path. The corrugated cardboard sheet 1 is pressed and folded by the folding bar 7 while a folding position is accurately regulated by a tip regulation portion of the folding guide 6, which is a folding guide member, in the traveling process. When the corrugated cardboard sheet 1 travels to a downstream portion and a folding angle becomes close to 180°, the corrugated cardboard sheet 1 is further folded by a folding belt 8.

In this folder gluer, as shown in FIG. 1A, the folding guide 6 is divided into an upstream-side folding guide (an upstream-side guide member) 10 and a downstream-side folding guide (a downstream-side guide member) 13 along a traveling direction of the corrugated cardboard sheet 1. Further, the upstream-side folding guide 10 is divided into a first folding guide (a first guide member) 11 on the inlet side and a second folding guide (a second guide member) 12 on the outlet side along the traveling direction of the corrugated cardboard sheet 1. FIG. 1A is a plan view showing the main part of the folder gluer, focusing on the folding guide 6, and the upper frame 2, the pulley 3, the conveying belt 4, the folding bar 7, the folding belt 8, and the like are omitted.

Further, the first folding guide 11 is movable with respect to the lower frame 5, the downstream-side folding guide 13 is fixed to the lower frame 5, and the second folding guide 12 is set such that an upstream-side end portion in the sheet traveling direction is connected to the first folding guide 11 by a pin 30 and tip regulation portions 11*a* and 12*a* (refer to FIGS. 2 and 3A) of the folding guides 11 and 12 are gently connected to each other. Details of these will be described below.

The upstream-side folding guide 10 may be configured to be one piece without being divided, as shown in FIG. 1B. FIG. 1B shows only the portion surrounded by a dashed-dotted line in FIG. 1A, and although, for convenience, only the upstream-side folding guide 10 on one side is shown, each of the right and left upstream-side folding guides 10 is configured to be one piece. In a case where the upstream-side folding guide 10 is configured to be one piece, the upstream end of the upstream-side folding guide 10 is connected, by the pin 30, to a sliding arm 21 (refer to FIG. 2) slidably mounted on a pin 20 (described later).

As shown in FIG. 2, the pin 20 is mounted on the inlet side of the lower frame 5 so as to protrude at a right angle (at a right angle with respect to a corrugated cardboard sheet guiding direction of the first folding guide 11, that is, in a device width direction). The sliding arm 21 having a U-shaped cross section is slidably mounted on the pin 20, as shown in FIG. 2. On the other hand, a shaft 23 is rotatably supported on the lower frame 5 by a bearing 22.

The shaft 23 is provided with its axial center line directed in a direction orthogonal to the pin 20, and an eccentric wheel 24 is mounted on the shaft 23. Further, the shaft 23 is rotationally driven by a motor (a third actuator) 25. In this way, when the eccentric wheel 24 is rotated, the first folding guide 11 slides along the axial direction of the pin 20 (to right and left in FIG. 2). Therefore, an inlet-side guide moving mechanism 45 for translating the first folding guide 11 in the device width direction is composed of the shaft 23, the eccentric wheel 24, the motor 25, and the like.

The shape of the tip regulation portion (the inlet-side tip regulation portion) 11*a* of the first folding guide 11 itself is not particularly different from that in the related art, and the tip regulation portion 13*a* (refer to FIGS. 3B and 3C of the downstream-side folding guide 13 is also not particularly different from that in the related art. Therefore, the description thereof will be omitted here.

The second folding guide 12 is connected, at its upstream-side end portion, to the movable first folding guide 11 by the pin 30, as shown in FIG. 1A, and is supported such that the upstream-side end portion oscillates in the device width direction according to the movement of the first folding guide 11.

Further, the second folding guide 12 is supported such that its downstream-side end portion in the sheet traveling direction is movable in the device width direction with respect to the lower frame 5 by an outlet-side guide moving mechanism 50. Details of the outlet-side guide moving mechanism 50 will be described later.

The corrugated cardboard sheet 1 is folded into panels mainly in the process of passing through the second folding guide 12. However, in this folding process, the right and left second folding guides 12 are basically disposed to be laterally inclined such that the position of the tip regulation portion (outlet-side tip regulation portion) 12*a* is gradually shifted inward (inward in the device width direction) as it goes toward the downstream side in the moving direction of the corrugated cardboard sheet, so as to correspond to the gradual movement of the position of the creasing line on the inner surface side of the folded portion of the corrugated cardboard sheet 1 inward (inward in the device width direction).

The downstream-side folding guide 13 has a first guide plate 13A and a second guide plate 13B in order from the upstream side, and each of the guide plates 13A and 13B is plate-shaped and disposed horizontally.

Further, the tip regulation portion 13Ba of the second guide plate 13B on the downstream side, of tip regulation portions 13Aa and 13Ba (refer to FIGS. 3B and 3C) of the guide plates 13A and 13B that come into contact with the folded portion of the corrugated cardboard sheet 1, is disposed to be laterally inclined such that the downstream-side portion in the sheet traveling direction is gradually shifted inward in the device width direction toward the downstream side.

Further, on the downstream side in the sheet traveling direction from the vicinity of the downstream-side end portion of the second folding guide 12, a large number of gauge rollers 60 are disposed side by side along each of the guides 12 and 13 outside each of the second folding guide 12 and the downstream-side folding guide 13 in the device width direction. The gauge roller 60 is rotatably mounted around a rotary shaft in a vertical direction and rotated by a drive motor (not shown).

In the portion where the gauge roller 60 is disposed, as shown in FIGS. 3A to 3C, the corrugated cardboard sheet 1 folded to a substantially right angle is guided by the guides 12 and 13 on the sheet inner surface and guided by the gauge roller 60 on the sheet outer surface, whereby the folding processing progresses gradually.

Further, as shown in FIG. 1A, a screw shaft 40 is screwed into the lower frame 5, and the screw shaft 40 is rotationally driven by a motor (first actuator) 41. Therefore, when the motor 41 is driven to rotate the screw shaft 40, the lower frame 5 moves in a machine width direction, and a frame moving mechanism 46 for moving the lower frame 5 in the machine width direction and moving the downstream-side folding guide 13 fixed to the lower frame 5 in the machine width direction is composed of the screw shaft 40, the motor 41, and the like. Further, although not shown in the drawings, the upper frame 2 is also made to move integrally with the lower frame 5.

Therefore, the position in the device width direction of the first folding guide 11 can be adjusted by cooperation between the motor 25 for moving the first folding guide 11 and the motor 41 for moving the lower frame. Further, in this way, the position of the tip regulation portion 12*a* of the second folding guide 12 can be finely adjusted to be gradually shifted inward (inward in the device width direction) by an appropriate shift amount from the first folding guide 11 side toward the downstream-side folding guide 13 side. In this manner, in the present embodiment, an adjustment mechanism for adjusting the inclination (laterally inclined state) in the device width direction of the tip regulation portion 12*a* of the second folding guide 12 is composed of the motor 25 and the motor 41.

Further, the guide position adjustment device is configured to include the inlet-side guide moving mechanism 45, the frame moving mechanism 46, and the outlet-side guide moving mechanism 50, and the folding guide device is configured to include the guide position adjustment device.

Here, the outlet-side guide moving mechanism 50 will be described with reference to FIGS. 4A to 4D.

Both the lower frame 5 and the second folding guide 12 extend along the sheet traveling direction, and the second folding guide 12 is located outside the lower frame 5 (outside in the device width direction). The outlet-side guide moving mechanism 50 is disposed in the space between the lower frame 5 and the second folding guide 12 at the downstream-side end portion of the second folding guide 12.

Further, the outlet-side guide moving mechanism 50 of the present embodiment moves the downstream-side end portion of the second folding guide 12 in the device width direction with respect to the lower frame 5, so that the tip regulation portion (the outlet-side tip regulation portion) 12*a* of the second folding guide 12 is moved in the device width direction.

The outlet-side guide moving mechanism 50 includes a fluid pressure cylinder (second actuator) 51 that is mounted on the lower frame 5 and expands and contracts along the sheet traveling direction, as a second actuator, and a moving direction conversion mechanism 52 that receives the movement of a piston rod 51*a* of the fluid pressure cylinder 51 in the sheet traveling direction and moves the downstream-side end portion of the second folding guide 12 in the device width direction. In the present embodiment, an air cylinder is applied to the fluid pressure cylinder 51.

The fluid pressure cylinder 51 is fixed by bolts (not shown) or the like through a bracket 53*a* mounted on the outside in the device width direction of the lower frame 5, and is supported, at a back surface-side end portion (an end portion on the side opposite to a protruding end of the piston rod 51*a* of the fluid pressure cylinder 51), by an auxiliary bracket 53*b* fixed to the bracket 53*a* with a bolt (not shown) or the like. Further, the fluid pressure cylinder 51 is made such that the pressure in a fluid pressure chamber (air pressure chamber) is adjusted through a fluid pressure adjusting valve (air pressure adjusting valve) (not shown) to move a piston 51*b* inside and the projection stroke of the piston rod 51*a* is adjusted.

Figure 4A:
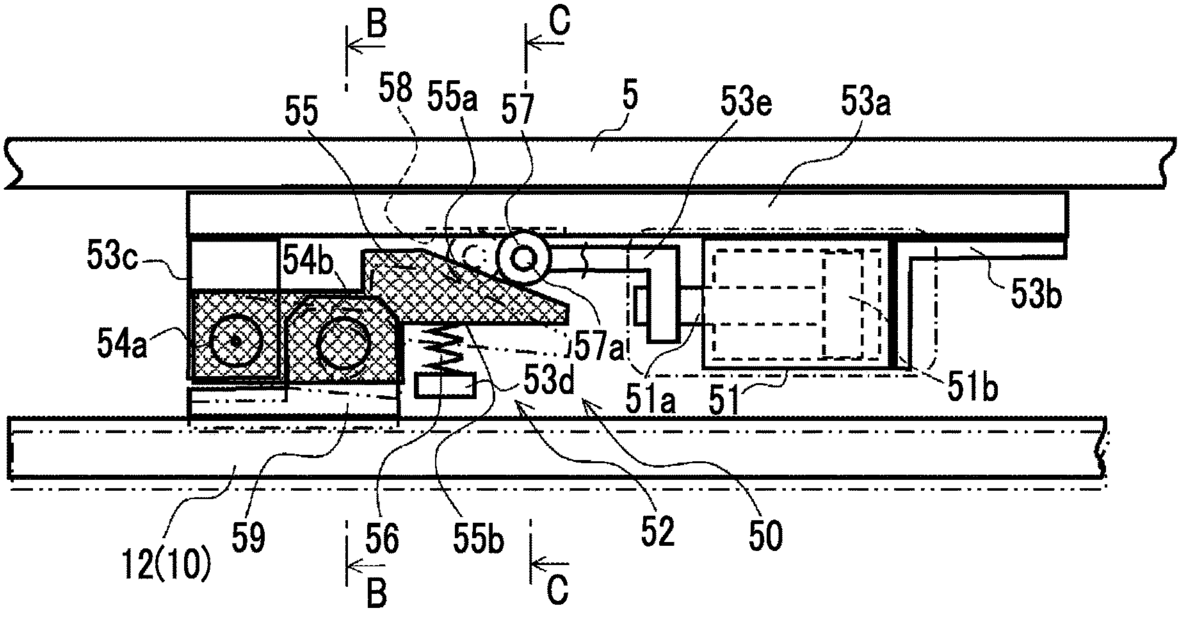
Figure 4B:
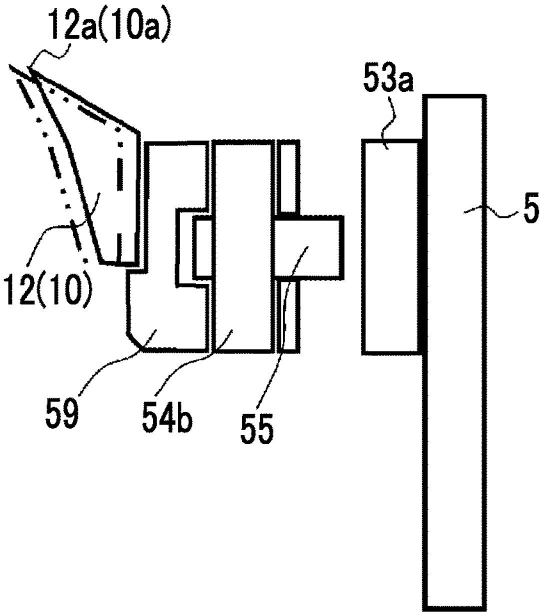
Figure 4C:
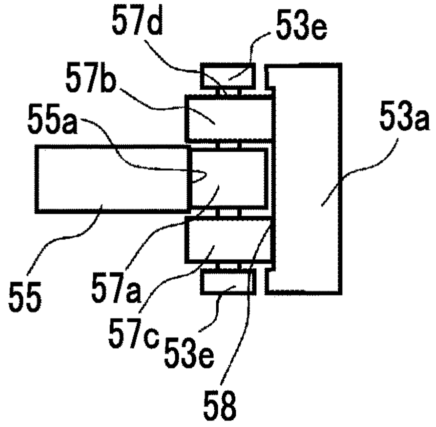

The moving direction conversion mechanism 52 includes a pin 54*a* which is supported by an auxiliary bracket 53*c* fixed to the lower frame 5 through the bracket 53*a* and which is disposed with its axis directed in the vertical direction, an oscillating member 55 which is oscillatably supported by the pin 54*a* and is connected to a bracket 59 mounted on the downstream-side end portion of the second folding guide 12 through a pin 54*b*, a contact surface 55*a* provided on the oscillating member 55, inclined in the device width direction with respect to the sheet traveling direction, and capable of coming into contact with the movable end portion of the piston rod 51*a*, and a coil spring (biasing member) 56 that presses the contact surface 55*a* against the movable end portion of the piston rod 51*a*. In FIG. 4A, the oscillating member 55 is hatched for convenience.

The pin 54*b* is supported by the bracket 59 mounted on the inside in the device width direction of the second folding guide 12, and is disposed with its axis directed in the vertical direction. Further, the coil spring 56 is interposed in a compressed state between the auxiliary bracket 53*d* and the back surface 55*b* of the oscillating member 55 with the base end thereof supported by an auxiliary bracket 53*d* fixed to the lower frame 5 and the tip thereof brought into contact with a back surface 55*b* of the oscillating member 55 on the side opposite to the contact surface 55*a*.

Further, in the present embodiment, the movable end portion of the piston rod 51*a* is equipped with a roller 57 supported through an auxiliary bracket 53*e* having an L shape when viewed from above, and the movement of the movable end portion of the piston rod 51*a* is transmitted to the contact surface 55*a* through the roller 57. The auxiliary bracket 53*e* corresponds to a moving member that moves in the sheet traveling direction in conjunction with the movement of the fluid pressure cylinder 51. The tip side of the auxiliary bracket 53*e* is divided into upper and lower portions, and a shaft 57*d* is supported by the upper and lower tip portions of the auxiliary bracket 53*e* with its axes directed in the vertical direction, and the roller 57 is supported by the shaft 57*d*. In the present embodiment, the roller 57 is composed of three rollers 57*a*, 57*b*, and 57*c* disposed in series in an up-down direction. The roller 57*a* at an intermediate portion in the up-down direction is in contact with the contact surface 55*a*, and the upper and lower rollers 57*b* and 57*c* are in contact with a groove surface of a roller guide groove 58 (described later). The configuration of the roller 57 is not limited to this.

In the present embodiment, the roller guide groove 58 formed by recessing a part of the outer surface in the device width direction of the bracket 53*a* is provided. The roller guide groove 58 extends in the sheet advancing direction, and the upper and lower rollers 57*b* and 57*c* among the rollers 57*a* to 57*c* are in contact with the groove surface of the roller guide groove 58 and roll in the roller guide groove 58. The roller guide groove 58 shifts the position of the roller 57 inward in the device width direction to cope with the narrowness in the device width direction of the space between the lower frame 5 and the second folding guide 12, and the roller 57*a* is in contact with the contact surface 55*a*, so that the shaft 57*d* is supported against a reaction force received from the contact surface 55*a* and the load burden on the roller 57 or the piston rod 51*a* is reduced.

Then, in this guide position adjustment device, as shown in FIG. 1A, a folder gluer control panel 42 is provided to control the motor 41 for moving the lower frame 5, the motor 25 for moving the first folding guide 11, or the fluid pressure of the fluid pressure cylinder 51. Switches 44, which include a push button switch for instructing the drive motor 25 to move the first folding guide 11 in an open direction or a closing direction, a switch for adjusting the projection stroke of the piston rod 51*a* by adjusting the fluid pressure of the fluid pressure cylinder 51, and the like, are connected to the control panel 42. Further, a configuration is made such that dimensional data or the like from a production management device 43 that manages the production of the entire box making machine is input to the control panel 42.

Since the folder gluer according to an embodiment of the present invention is configured as described above, when the folder gluer control panel 42 obtains the positional information of the creasing lines C1 and C2 of the corrugated cardboard sheet 1 from the production management device 43, the folder gluer control panel 42 rotates the motor 41 to move the lower frames 5, so that the tip regulation portions 11*a* of the first folding guides 11 are disposed to be located directly below the creasing lines C1 and C2 (refer to FIG. 1A).

The operator passes the sheet in this state to confirm a folded state and determines whether or not the position of the downstream-side folding guide 13 is appropriate, and if it is necessary to widen or narrow the downstream-side folding guide 13, the operator issues an instruction with the push button switch 44. For example, it is assumed that an instruction to narrow the downstream-side folding guide 13 is given. Then, the control panel 44 controls the motor 41 to narrow the lower frame 5, and drives the motor 25 to widen the first folding guide 11 (that is, the inlet-side tip regulation portion of the upstream-side folding guide 10). In this way, the position of the downstream-side folding guide 13 can be narrowed without changing the position of the first folding guide 11. In the case of widening, it is favorable if the totally opposite control is performed.

According to this folder gluer, since an operation is performed in cooperation such that the position in the width direction of the inlet-side tip regulation portion (the first folding guide 11) of the upstream-side folding guide 10 does not change even if the position in the width direction of the downstream-side folding guide 13 of the folding guides 6 is changed, the position in the width direction of the downstream-side folding guide 13 can be adjusted without affecting the position in the width direction of the inlet-side tip regulation portion (the first folding guide 11) of the upstream-side folding guide 10, and by setting the position in the width direction of the downstream-side folding guide 13 in accordance with a box depth (including an apparent box depth) of a corrugated cardboard box to be manufactured, it is possible to appropriately manufacture even a corrugated cardboard box with a deep box depth.

First, in this guide position adjustment device, in a case of manufacturing a corrugated cardboard box with a deep box depth (including an apparent box depth), the guide position is adjusted by operating the frame moving mechanism 46, the outlet-side guide moving mechanism 50, and the inlet-side guide moving mechanism 45 by the following method.

That is, it is determined whether or not the length (usually, corresponding to a box depth) in the traveling direction of the corrugated cardboard sheet 1 is equal to or greater than a predetermined value set in advance, and in a case where the length in the traveling direction of the corrugated cardboard sheet 1 is equal to or greater than the predetermined value, this method is carried out as described below, and the positions in the width direction of the folding guides 11, 12, and 13 are manipulated with respect to a case where the length in the traveling direction is smaller than the predetermined value.

The predetermined value related to the length in the traveling direction of the corrugated cardboard sheet 1 can be set in advance, for example, by experiments. Further, the length in the traveling direction of the corrugated cardboard sheet 1 and the adjustment result of the guide position may be recorded, and a specific predetermined value for each order or each box making machine may be set. Alternatively, when the operator checks the folded corrugated cardboard sheet 1 and determines that the guide position needs to be adjusted, the length in the traveling direction of the corrugated cardboard sheet 1 at this time may be set to a predetermined value.

Figure 5A:
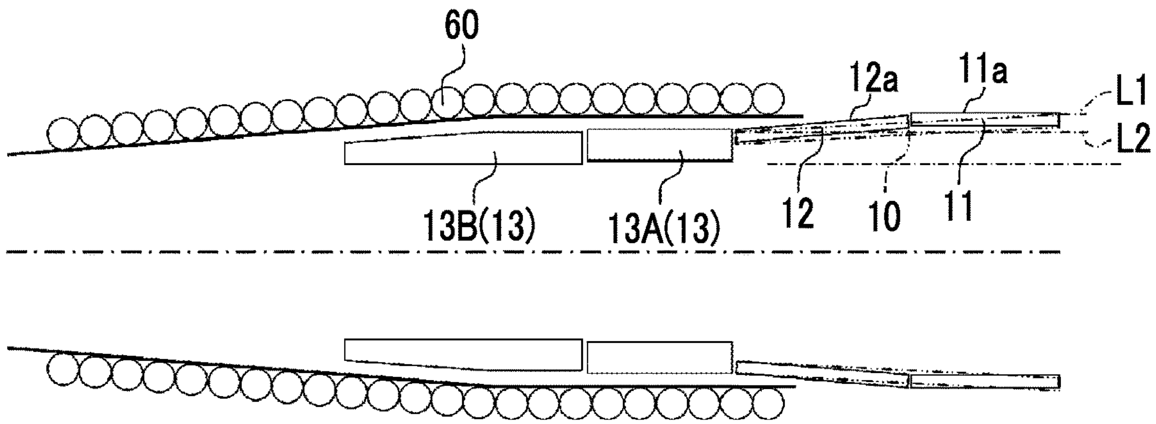
Figure 5B:
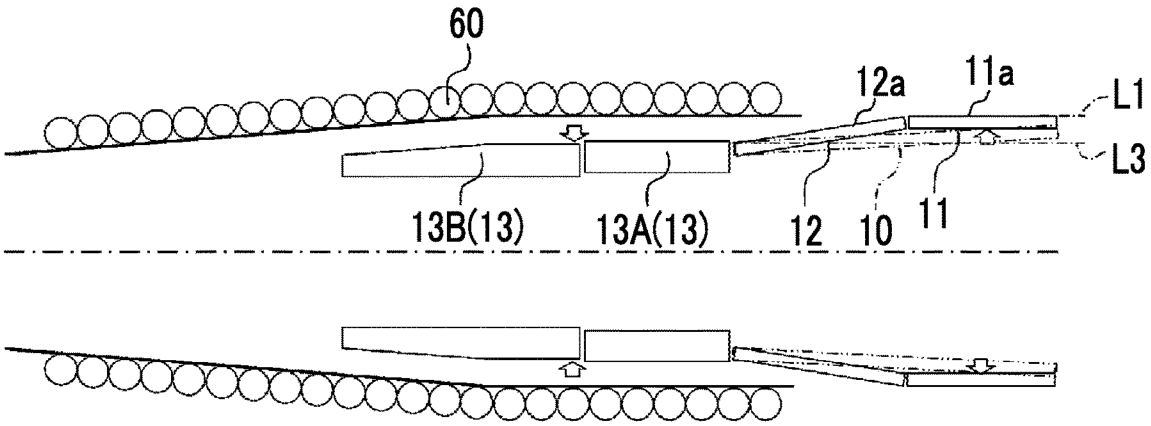

First, the motor (the first actuator) 41 is operated from the normal state shown in FIG. 5A (a state where a corrugated cardboard sheet having no deep box depth is manufactured) to translate the lower frame 5 inward in the device width direction, as shown in FIG. 5B. After completion of the movement of the lower frame 5 (the movement of the downstream-side folding guide 13 inward in the device width direction) or at the same time as the movement of the lower frame 5 (the movement of the downstream-side folding guide 13 inward in the device width direction), the motor (the third actuator) 25 is operated to translate the first folding guide 11 outward in the device width direction so as to offset the movement of the lower frame 5. Next, the fluid pressure cylinder (the second actuator) 51 is operated to move the downstream-side end portion in the sheet traveling direction of the second folding guide 12 outward in the device width direction, as shown in FIG. 5C.

Figure 5C:
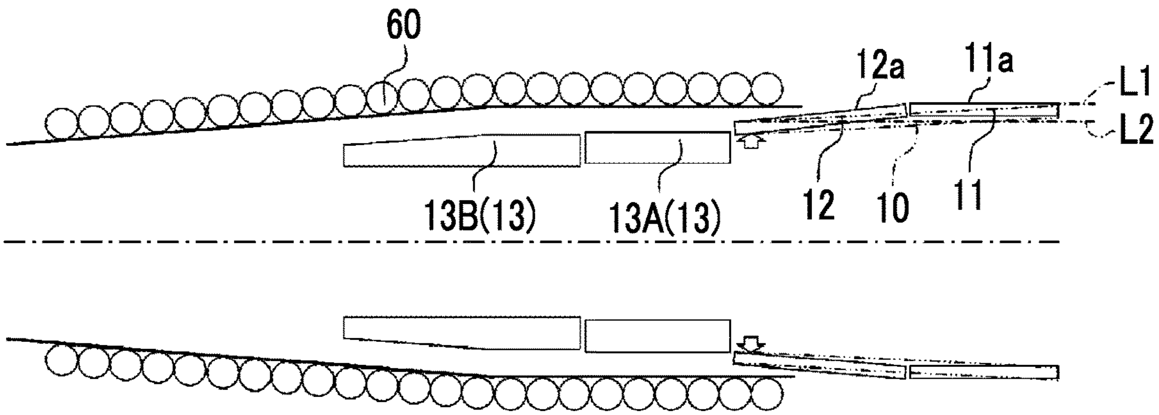

In FIGS. 5A to 5C, the position in the device width direction of the tip regulation portion 11*a* of the first folding guide 11 is indicated by a dashed-dotted line L1, and the position in the device width direction of the downstream-side end portion of the tip regulation portion 12*a* of the second folding guide 12 is indicated by dashed-dotted lines L2 and L3. By translating the first folding guide 11 outward in the device width direction along with the movement of the lower frame 5 inward in the device width direction, although the position in the device width direction of the tip regulation portion 11*a* of the first folding guide 11 is at L1 and does not change, the position in the device width direction of the downstream-side end portion of the tip regulation portion 12*a* of the second folding guide 12 changes from L2 to L3 inward in the device width direction. In contrast, by moving the downstream-side end portion in the sheet traveling direction of the second folding guide 12 outward in the device width direction, the position in the device width direction of the downstream-side end portion of the tip regulation portion 12*a* of the second folding guide 12 is returned from L3 to L2.

The fluid pressure cylinder (the second actuator) 51 is interlocked to prevent collision with the gauge roller 60 when the second folding guide 12 moves outward in the device width direction. In this case, the fluid pressure cylinder (the second actuator) 51 does not operate until the movement of the lower frame 5 is completed. Alternatively, the fluid pressure cylinder (the second actuator) 51 does not operate unless the lower frame 5 moves to a position where it does not collide with the gauge roller 60 even if the second folding guide 12 moves.

In the case of the upstream-side folding guide 10 (indicated by a two-dot chain line in FIGS. 5A to 5C) that is not divided but configured to be one piece, for example, as shown in FIG. 5B, after completion of the movement of the lower frame 5 (the movement of the downstream-side folding guide 13 inward in the device width direction), the motor 25 and the fluid pressure cylinder 51 are operated to translate the upstream-side folding guide 10 outward in the device width direction so as to offset the movement of the lower frame 5, as shown in FIG. 5C. Alternatively, even before the movement of the lower frame 5 is completed, if the downstream-side folding guide 13 has moved to a position where the upstream-side folding guide 10 does not collide with the gauge roller 60, the motor 25 and the fluid pressure cylinder 51 are operated to translate the upstream-side folding guide 10 outward in the device width direction.

Figure 6A:
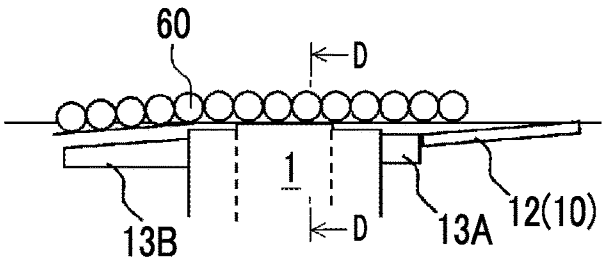

The corrugated cardboard sheet 1 is folded with its tip (the downstream-side end portion in the sheet conveying direction) as a reference. In a case where a general corrugated cardboard box whose box depth is not deep is manufactured in the normal state shown in FIG. 5A, when the rear end (the upstream-side end portion in the sheet conveying direction) of the corrugated cardboard sheet 1 is located as shown in FIG. 6A, the rear end of the corrugated cardboard sheet 1 is folded as shown in FIG. 6B. In a case where the depth of a box to be manufactured is not deep (in a case where the length in the traveling direction of the corrugated cardboard sheet 1 is smaller than a predetermined value), since the tip of the corrugated cardboard sheet 1 is not greatly separated from the rear end, the tip of the corrugated cardboard sheet 1 is not greatly folded, and the rear end of the corrugated cardboard sheet 1 that is folded following this does not interfere with the first guide plate 13A.

Figure 6C:
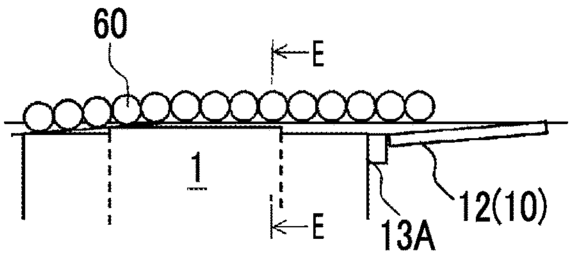
Figure 6B:
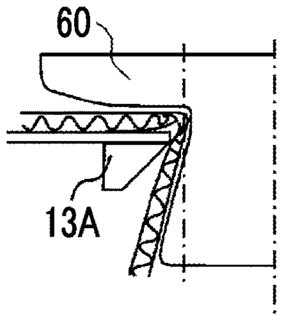
Figure 6D:
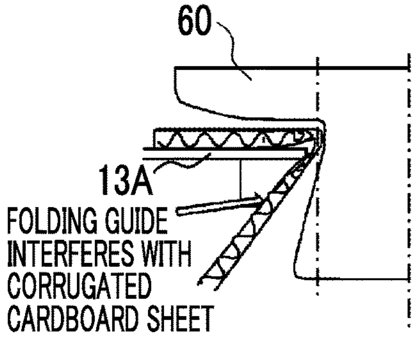

On the other hand, in a case where a corrugated cardboard box with a deep box depth is manufactured in the normal state shown in FIG. 5A, when the rear end of the corrugated cardboard sheet 1 is located as shown in FIG. 6C, the rear end of the corrugated cardboard sheet 1 is folded as shown in FIG. 6D. In a case where the depth of a box to be manufactured is deep (in a case where the length in the traveling direction of the corrugated cardboard sheet 1 is equal to or greater than a predetermined value), since the tip of the corrugated cardboard sheet 1 is greatly separated from the rear end, the tip of the corrugated cardboard sheet 1 is greatly folded, and the rear end of the corrugated cardboard sheet 1 that is folded following this interferes with the first guide plate 13A.

Figure 7A:
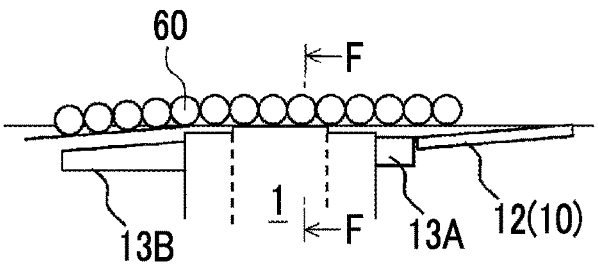
Figure 7C:
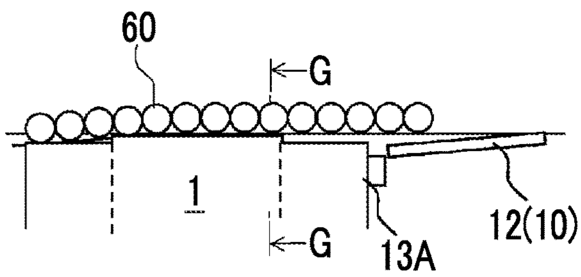
Figure 7B:
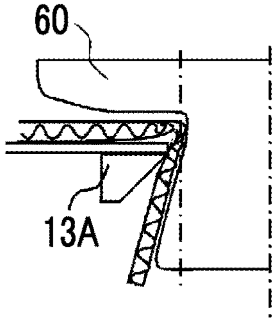
Figure 7D:
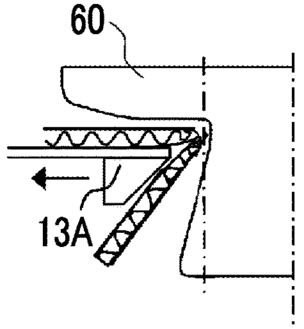

Therefore, in a case of manufacturing a corrugated cardboard box with a deep box depth, if the lower frame 5 is translated inward in the device width direction as shown in FIG. 5B, when the rear end of the corrugated cardboard sheet 1 is located as shown in FIG. 7C, even if the tip of the corrugated cardboard sheet 1 is greatly folded, the rear end of the corrugated cardboard sheet 1 is prevented from interfering with the first guide plate 13A, as shown in FIG. 7D. In this way, it is possible to prevent the rear end side of the corrugated cardboard sheet 1 from embracing the upstream-side half of the first guide plate 13A.

In a case where the depth of a box to be manufactured is not deep, even if the rear end (the upstream-side end portion in the sheet conveying direction) of the corrugated cardboard sheet 1 is at the position shown in FIG. 7A, the rear end of the corrugated cardboard sheet 1 is folded without interfering with the first guide plate 13A, as shown in FIG. 7B. Therefore, in this folding guide device, in a case where the depth of a box to be manufactured is not deep, the lower frame 5 is not translated inward in the device width direction.

However, since the downstream-side folding guide 13 including the first guide plate 13A is translated inward in the device width direction by translating the lower frame 5 inward in the device width direction, the first folding guide 11 or the second folding guide 12 supported by the lower frame is also translated inward in the device width direction.

Since the corrugated cardboard sheet 1 is folded along the creasing lines mainly in the process of passing through the second folding guide 12, the outlet of the second folding guide 12 is also an important portion for determining a folding position, and if the outlet of the second folding guide 12 moves inward in the device width direction, it rather becomes a factor of destabilizing folding accuracy.

Further, the position of the first folding guide 11 also affects the inclination (laterally inclined state) in the device width direction of the tip regulation portion 12*a* of the second folding guide 12.

Therefore, as shown in FIG. 5C, the downstream-side end portion in the sheet traveling direction of the second folding guide 12 is moved outward in the device width direction, and the motor (the third actuator) 25 is operated to translate the first folding guide 11 outward in the device width direction. In this way, as shown in FIGS. 5A, 5B, and 5C, by moving the tip regulation portion (the outlet-side tip regulation portion) 12*a* of the second folding guide 12 in an inner range from the position in the device width direction of the tip regulation portion (the inlet-side tip regulation portion) 11*a* of the first folding guide 11, it is possible to maintain the inclination (laterally inclined state) in the device width direction of the tip regulation portion 12*a* of the second folding guide 12. Further, the influence of the translation of the lower frame 5 inward in the device width direction can be offset, and it is possible to eliminate a factor of destabilizing folding accuracy and stabilize the folding accuracy.

Further, since the outlet-side guide moving mechanism 50 for moving the second folding guide 12 in the device width direction is configured to include the fluid pressure cylinder (the second actuator) 51 that is mounted on the lower frame 5 and expands and contracts along the sheet traveling direction, and the moving direction conversion mechanism 52 for receiving the movement of the piston rod 51*a* of the fluid pressure cylinder 51 in the sheet traveling direction and moving the downstream-side end portion of the second folding guide 12 in the device width direction, the outlet-side guide moving mechanism 50 can be disposed using the limited space between the supporting frame and the second guide member.

Since the moving direction conversion mechanism 52 is configured to include the oscillating member 55 which is oscillatably supported by the lower frame 5 through the pin 54*a*, the contact surface 55*a* that is provided on the oscillating member 55, is inclined in the device width direction with respect to the sheet traveling direction, and can come into contact with the movable end portion of the piston rod 51*a*, and the coil spring 56 that presses the contact surface 55*a* against the movable end portion of the piston rod 51*a*, the force of the fluid pressure cylinder 51 can be amplified and transmitted to the downstream-side end portion of the second folding guide 12 through the contact surface 55*a*, and the downstream-side end portion of the second folding guide 12 can be moved in the device width direction by using the fluid pressure cylinder 51 having low output.

Further, since the movable end portion of the piston rod 51*a* is equipped with the roller 57 that can come into contact with the contact surface 55*a* while freely rotating during movement to transmit the force in the sheet traveling direction to the oscillating member, a transmission loss of the force from the movable end portion of the piston rod 51*a* to the second folding guide 12 through the contact surface 55*a* is reduced, the outlet-side guide moving mechanism 50 can be smoothly operated, and the burden on the fluid pressure cylinder 51 is also reduced.

Although the embodiment of the present invention has been described above, the present invention is not limited to such an embodiment, and various modifications can be made within a scope which does not depart from the gist of the present invention.

For example, in the embodiment described above, the outlet-side guide moving mechanism 50 is disposed in the space between the lower frame 5 and the second folding guide 12. However, the place where the outlet-side guide moving mechanism is disposed is not limited to the space between the lower frame 5 and the second folding guide 12.

However, the outlet-side guide moving mechanism 50 is disposed in the space between the lower frame 5 and the second folding guide 12, so that an increase in size of the device is suppressed.

Further, although design is made such that the fluid pressure cylinder 51 that expands and contracts along the sheet traveling direction is applied to an actuator of the outlet-side guide moving mechanism 50 and the outlet-side guide moving mechanism 50 is accommodated in the limited space between the lower frame 5 and the second folding guide 12, various types of outlet-side guide moving mechanisms can be applied as long as the space between the lower frame 5 and the second folding guide 12 does not interfere.

Figure 4D:
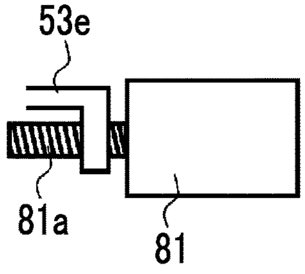

For example, FIG. 4D shows a modification example of the portion inside the frame indicated by a dashed-dotted line in FIG. 4A, and as shown in FIG. 4D, instead of the fluid pressure cylinder 51, a motor 81 may be used. In a case of using the motor 81, a conversion mechanism for converting rotary motion into linear motion is required. As the conversion mechanism, for example, a configuration can be applied in which a servomotor is used as the motor 81, a male screw is provided on a rotary shaft 81*a* of the motor 81, and a female screw that is screwed to the male screw of the rotary shaft 81*a* is provided in the auxiliary bracket 53*e*. In this case, it is preferable to apply a ball screw mechanism in which a ball is interposed between the male screw and the female screw.

With such a configuration, by rotating the motor 81 instead of expanding and contracting the fluid pressure cylinder 51, the auxiliary bracket 53*e* can be configured as a moving member that moves in the sheet traveling direction in conjunction with the movement of the motor 81, and the same effect as in a case of using the fluid pressure cylinder 51 can be obtained.

Further, in a case where a servomotor is used as the motor 81, stepless adjustment can be performed with high precision, so that the position in the device width direction of the upstream-side folding guide 10 (the second folding guide 12) can be easily set to an optimum position.

Various conversion mechanisms have been developed for the conversion mechanism for converting rotary motion into linear motion, and any suitable conversion mechanism may be selected and adopted.

Figure 8A:
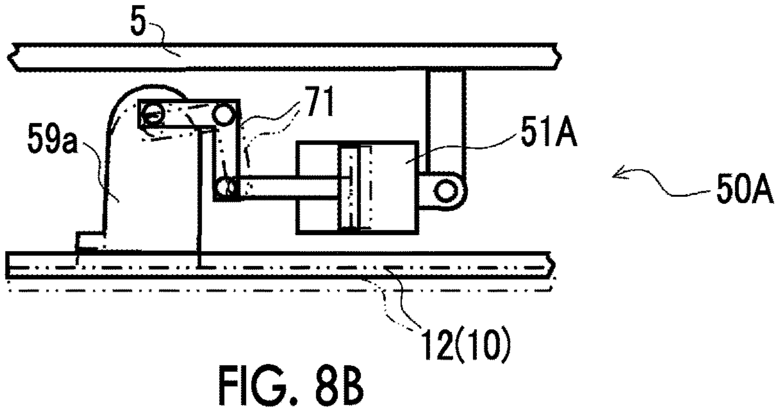
Figure 8B:
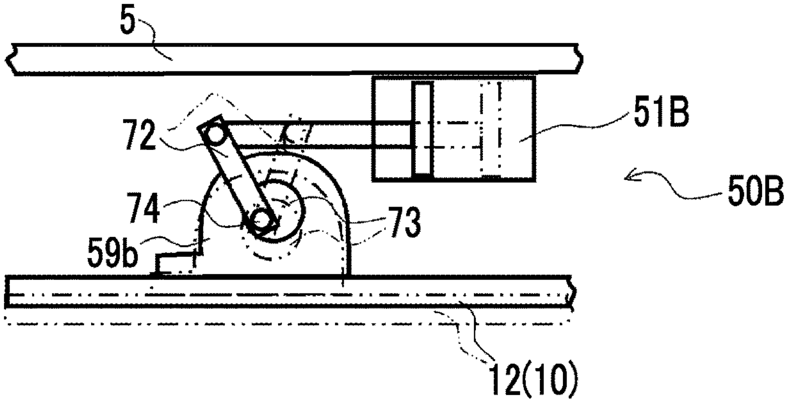
Figure 8C:
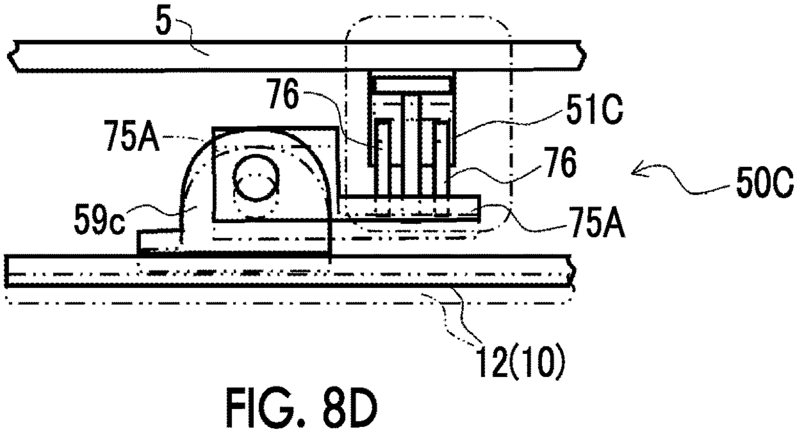
Figure 8E:
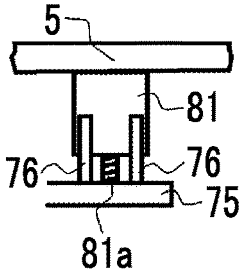
Figure 8D:
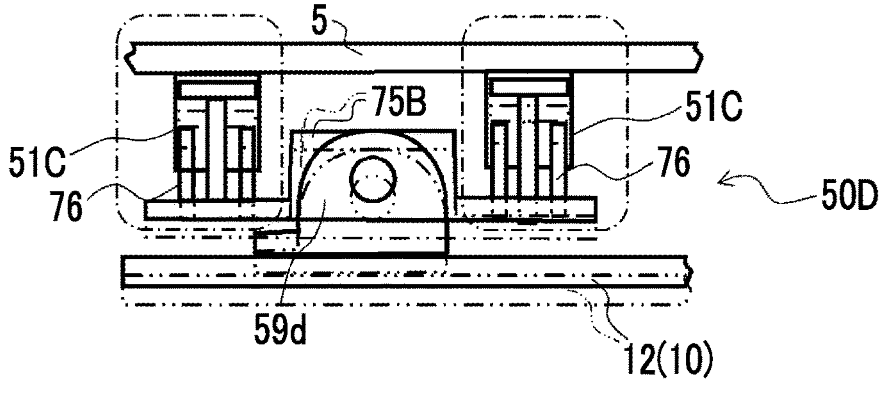

Further, FIGS. 8A to 8D show other modification examples of the outlet-side guide moving mechanism, FIG. 8A shows an outlet-side guide moving mechanism 50A of a first modification example, FIG. 8B shows an outlet-side guide moving mechanism 50B of a second modification example, FIG. 8C shows an outlet-side guide moving mechanism 50C of a third modification example, and FIG. 8D shows an outlet-side guide moving mechanism 50D of a fourth modification example.

As shown in FIG. 8A, in the outlet-side guide moving mechanism 50A of the first modification example, an air cylinder (fluid pressure cylinder) 51A is mounted on the lower frame 5 so as to expand and contract in the sheet traveling direction along the lower frame 5 and the second folding guide 12, and an L-shaped link 71 is interposed between the tip portion of a piston rod of the air cylinder 51A and a bracket 59*a* mounted on the second folding guide 12. The L-shaped link 71 is, at its intermediate portion (bent portion), mounted on a supporting shaft (fixed to the lower frame 5) extending in a vertical direction, and has one end rotatably pin-coupled to the tip portion of the piston rod and the other end rotatably pin-coupled to the bracket 59*a*. In this way, when the air cylinder 51A expands and contracts in the sheet traveling direction, the second folding guide 12 moves in the device width direction through the bracket 59*a*.

As shown in FIG. 8B, in the outlet-side guide moving mechanism 50B of the second modification example, an air cylinder (fluid pressure cylinder) 51B is mounted on the lower frame 5 so as to expand and contract in the sheet traveling direction along the lower frame 5 and the second folding guide 12, and a link 72 is interposed between the tip portion of a piston rod of the air cylinder 51B and a bracket 59*b* mounted on the second folding guide 12. One end of the link 72 is integrally coupled to the tip portion of the piston rod, and the other end is integrally coupled to a rotary shaft 74 mounted at an eccentric position of a rotating member 73 mounted on the bracket 59*b*. In this way, when the air cylinder 51B expands and contracts in the sheet traveling direction, the rotary shaft 74 rotates along with oscillation of the link 72, and the bracket 59*b* and the second folding guide 12 move in the device width direction along with the rotating member 73.

As shown in FIG. 8C, in the outlet-side guide moving mechanism 50C of the third modification example, an air cylinder (fluid pressure cylinder) 51C is mounted on the lower frame 5 so as to expand and contract in the device width direction, and an interlocking member 75A is connected to the tip portion of a piston rod of the air cylinder 51C. One end portion of the interlocking member 75A is connected to the tip portion of the piston rod and is supported to be movable in the device width direction through a guide 76, and the other end portion is connected to a bracket 59*c* mounted on the second folding guide 12. In this way, when the air cylinder 51C expands and contracts in the device width direction, the interlocking member 75A moves in the device width direction while being guided by the guide 76, and the bracket 59*c* and the second folding guide 12 move in the device width direction.

As shown in FIG. 8D, in the outlet-side guide moving mechanism 50D of the fourth modification example, a pair of air cylinders (fluid pressure cylinders) 51C are mounted on the lower frame 5 so as to expand and contract in the device width direction, and an interlocking member 75B is connected to the tip portions of piston rods of the two air cylinders 51C. Both end portions of the interlocking member 75B are connected to the tip portions of the piston rods and supported to be movable in the device width direction through the guides 76, and the intermediate portion is connected to a bracket 59*d* mounted on the second folding guide 12. In this way, when the air cylinder 51C expands and contracts in the device width direction, the interlocking member 75B moves in the device width direction while being guided by the guides 76, and the bracket 59*d* and the second folding guide 12 move in the device width direction. Since both ends of the interlocking member 75B are driven by the air cylinders 51C while being guided by the guides 76 to move the bracket 59*d* at the intermediate portion in the device width direction, the movement of the second folding guide 12 in the device width direction is stably performed without difficulty.

Further, in FIGS. 8C and 8D, the examples using the air cylinders (fluid pressure cylinders) 51C and 51D as the second actuators have been described. However, also in these modification examples, instead of the fluid pressure cylinders 51C and 51D, the motor 81 may be used as the second actuator.

For example, in the modification examples shown in FIGS. 8C and 8D, instead of the fluid pressure cylinders 51C and 51D, the motor 81 and a conversion mechanism for converting rotary motion into linear motion can be applied as shown in FIG. 8E, for example. FIG. 8E shows only the portion surrounded by a dashed-dotted line in FIGS. 8C and 8D, and the conversion mechanism can be configured with a ball screw mechanism or the like having a configuration in which, for example, a servomotor is used as the motor 81, a male screw is provided on a rotary shaft 81*a* of the motor, and a female screw that is screwed to the male screw of the rotary shaft 81*a* is provided on the interlocking member 75 that moves in the device width direction.

In this manner, even in a case where the motor 81 is used instead of the fluid pressure cylinders 51A to 51D, the same effect as those in the modification examples shown in FIGS. 8C and 8D can be obtained. Further, similarly to the above, in a case where a servomotor is used as the motor 81, it is possible to perform stepless adjustment with high precision, so that the position in the device width direction of the upstream-side folding guide 10 (the second folding guide 12) is easily set to an optimum position.

In the embodiment described above, the upstream-side folding guide 10 is configured to be divided into the first folding guide 11 and the second folding guide 12, or to be a single piece without being divided. However, there is no limitation thereto. The upstream-side folding guide 10 may be divided into three or more pieces, for example. In this case, with a configuration made such that the tip regulation portion on the most outlet side in the upstream-side folding guide 10, among the folding guides divided into three or more, moves in the device width direction in an inner range from the position in the device width direction of the tip regulation portion on the most inlet side, the same effect as that in the embodiment described above can be obtained.

Additional Remarks

Regarding the above embodiments, the following additional remarks are further disclosed.

(Additional Remark 1)

A guide position adjustment device including: an upstream-side guide member and a downstream-side guide member which are mounted in pairs to right and left on a folder gluer that folds a corrugated cardboard sheet into a box while the corrugated cardboard sheet travels in a sheet traveling direction, and which are disposed in order from an upstream side in the sheet traveling direction, in which the guide position adjustment device is mounted on a folding guide device provided with a frame moving mechanism for translating a supporting frame, which supports the upstream-side guide member and the downstream-side guide member, in a device width direction perpendicular to the sheet traveling direction by a first actuator, the upstream-side guide member includes at least an inlet-side tip regulation portion and an outlet-side tip regulation portion of the upstream-side guide member, among tip regulation portions that come into contact with a folded portion of the corrugated cardboard sheet, and the guide position adjustment device includes an outlet-side guide moving mechanism for moving the outlet-side tip regulation portion in the device width direction with respect to the supporting frame in an inner range from a position in the device width direction of the inlet-side tip regulation portion by a second actuator.

(Additional Remark 2)

In the guide position adjustment device according to Additional Remark 1, both the supporting frame and the upstream-side guide member extend along the sheet traveling direction, and the outlet-side guide moving mechanism is disposed in a space extending along the sheet traveling direction between the supporting frame and the upstream-side guide member.

(Additional Remark 3)

In the guide position adjustment device according to Additional Remark 1 or 2, the outlet-side guide moving mechanism includes a fluid pressure cylinder which is the second actuator and which is mounted on the supporting frame and expands and contracts along the sheet traveling direction, and a moving direction conversion mechanism for converting movement of a piston rod of the fluid pressure cylinder in the sheet traveling direction into a moving direction in which a downstream-side end portion of the upstream-side guide member moves in the device width direction.

(Additional Remark 4)

In the guide position adjustment device according to Additional Remark 1 or 2, the outlet-side guide moving mechanism includes a motor which is the second actuator and is mounted on the supporting frame, and a moving direction conversion mechanism for converting rotation of a rotary shaft of the motor into a moving direction in which a downstream-side end portion of the upstream-side guide member moves in the device width direction.

In a case where a servomotor is applied to the motor, it is preferable that stepless adjustment is applied.

(Additional Remark 5)

In the guide position adjustment device according to Additional Remark 3 or 4, the moving direction conversion mechanism includes an oscillating member which is oscillatably supported by the supporting frame and is connected to the downstream-side end portion of the upstream-side guide member, a contact surface which is provided on the oscillating member, inclined in the device width direction with respect to the sheet traveling direction, and capable of coming into contact with a movable end portion of a moving member that moves in the sheet traveling direction in conjunction with movement of the second actuator, and a biasing member that presses the contact surface against the movable end portion.

(Additional Remark 6)

In the guide position adjustment device according to Additional Remark 5, the moving end portion is equipped with a roller capable of transmitting only a force in a direction perpendicular to the contact surface to the oscillating member.

(Additional Remark 7)

In the guide position adjustment device according to any one of Additional Remarks 1 to 6, the upstream-side guide member is configured to include a first guide member and a second guide member from an upstream side.

(Additional Remark 8)

In the guide position adjustment device according to any one of Additional Remarks 1 to 7, the guide position adjustment device further including an inlet-side guide moving mechanism for moving the inlet-side tip regulation portion of the upstream-side guide member in the device width direction by a third actuator.

(Additional Remark 9)

A folding guide device including:

an upstream-side guide member and a downstream-side guide member which are mounted in pairs to right and left on a folder gluer that folds a corrugated cardboard sheet into a box while the corrugated cardboard sheet travels, and which are disposed in order from an upstream side, and the guide position adjustment device according to any one of Additional Remarks 1 to 8.

(Additional Remark 10)

In the folding guide device according to Additional Remark 9, an upstream-side end portion in the sheet traveling direction of the second guide member and the downstream-side end portion of the first guide member are link-coupled to each other.

(Additional Remark 11)

In the folding guide device according to Additional Remark 8 or 9, a tip regulation portion of the second guide member, among tip regulation portions which are provided at the first guide member and the second guide member and come into contact with a folded portion of the corrugated cardboard sheet, is disposed to be laterally inclined so as to be gradually shifted inward in the device width direction towards the downstream.

(Additional Remark 12)

In the folding guide device according to any one of Additional Remarks 9 to 11, the downstream-side guide member includes a first guide plate and a second guide plate in order from the upstream side, and a downstream-side portion in the sheet traveling direction of a tip regulation portion of the second guide plate, among tip regulation portions which come into contact with a folded portion of the corrugated cardboard sheet, is disposed to be laterally inclined so as to be gradually shifted inward in the device width direction towards the downstream.

(Additional Remark 13)

A folder gluer including: the folding guide device according to any one of Additional Remarks 9 to 12.

(Additional Remark 14)

A box making machine including: the folder gluer according to Additional Remark 13.

(Additional Remark 15)

A folding guide position adjustment method for adjusting positions in a device width direction of the upstream-side guide member and the downstream-side guide member by the guide position adjustment device according to Additional Remark 8, the method including:

in a case where a length in a traveling direction of the corrugated cardboard sheet is equal to or greater than a predetermined value set in advance, translating the supporting frame inward in the device width direction by operating the first actuator and moving at least the inlet-side tip regulation portion of the upstream-side guide member outward in the device width direction by operating the third actuator, with respect to a case where the length in a traveling direction is smaller than the predetermined value, and thereafter, moving the outlet-side tip regulation portion outward in the device width direction in an inner range from a position in the device width direction of the inlet-side tip regulation portion by operating the second actuator.

REFERENCE SIGNS LIST

1: corrugated cardboard sheet
1A: corrugated cardboard box
2: upper frame
3: pulley
4: conveying belt
5: lower frame (supporting frame)
6: folding guide (folding ruler)
7: folding bar
8: folding belt
10: upstream-side folding guide (upstream-side guide member)
11: first folding guide (first guide member) of upstream-side folding guide 10
11*a*: tip regulation portion (inlet-side tip regulation portion) of first folding guide (first guide member)
12: second folding guide (second guide member) of upstream-side folding guide 10
12*a*: tip regulation portion (outlet-side tip regulation portion) of second folding guide (second guide member)
13: downstream-side folding guide (downstream-side guide member)
13*a*: tip regulation portion of downstream-side folding guide 13
13A: first guide plate of downstream-side folding guide 13
13Aa: tip regulation portion of first guide plate 13A
13B: second guide plate of downstream-side folding guide 13
13Ba: tip regulation portion of second guide plate 13B
20: pin
21: sliding arm
22: bearing
23: shaft
24: eccentric wheel
25: motor (third actuator)
30, 31: pin
40: screw shaft
41: motor (first actuator)
42: folder gluer control panel
43: production management device
44: switches
45: inlet-side guide moving mechanism
46: frame moving mechanism
50: outlet-side guide moving mechanism
51: fluid pressure cylinder (second actuator)
51*a*: piston rod
51*b*: piston
52: moving direction conversion mechanism
53*a*, 59: bracket
53*b*, 53*c*, 53*d*: auxiliary bracket
53*e*: auxiliary bracket as a moving member that moves in a sheet traveling direction
54*a*, 54*b*: pin
55: oscillating member
55*a*: contact surface of oscillating member 55
56: coil spring (biasing member)
55*b*: back surface of oscillating member 55
57: roller
57*d*: shaft
58: roller guide groove

60: gauge roller
C, C1, C2: creasing line
S: slot

The invention claimed is:

1. A guide position adjustment device comprising:

an upstream-side guide member and a downstream-side guide member which are mounted in pairs to right and left on a folder gluer that folds a corrugated cardboard sheet into a box while the corrugated cardboard sheet travels in a sheet traveling direction, and which are disposed in order from an upstream side in the sheet traveling direction, wherein the guide position adjustment device is mounted on a folding guide device provided with a frame moving mechanism for translating a supporting frame, which supports the upstream-side guide member and the downstream-side guide member, in a device width direction perpendicular to the sheet traveling direction by a first actuator, the upstream-side guide member includes at least an inlet-side tip regulation portion and an outlet-side tip regulation portion of the upstream-side guide member, among tip regulation portions that come into contact with a folded portion of the corrugated cardboard sheet, and the guide position adjustment device includes an outlet-side guide moving mechanism for moving the outlet-side tip regulation portion in the device width direction with respect to the supporting frame in an inner range from a position in the device width direction of the inlet-side tip regulation portion by a second actuator, and an inlet-side guide moving mechanism for moving the inlet-side tip regulation portion of the upstream-side guide member in the device width direction by a third actuator, and the second actuator is a motor, the motor being mounted on the supporting frame and moving a downstream end of the outlet-side tip regulation portion in the device width direction via a bracket provided at the downstream end of the outlet-side tip regulation portion.

2. The guide position adjustment device according to claim 1, wherein both the supporting frame and the upstream-side guide member extend along the sheet traveling direction, and the outlet-side guide moving mechanism is disposed in a space extending along the sheet traveling direction between the supporting frame and the upstream-side guide member.

3. The guide position adjustment device according to claim 1, wherein the outlet-side guide moving mechanism includes a fluid pressure cylinder which is the second actuator and which is mounted on the supporting frame and expands and contracts along the sheet traveling direction, and a moving direction conversion mechanism for converting movement of a piston rod of the fluid pressure cylinder in the sheet traveling direction into a moving direction in which a downstream-side end portion of the upstream-side guide member moves in the device width direction.

4. The guide position adjustment device according to claim 3, wherein the moving direction conversion mechanism includes an oscillating member which is oscillatably supported by the supporting frame and is connected to the downstream-side end portion of the upstream-side guide member, a contact surface which is provided on the oscillating member, inclined in the device width direction with respect to the sheet traveling direction, and capable of coming into contact with a movable end portion of a moving member that moves in the sheet traveling direction in conjunction with movement of the second actuator, and a biasing member that presses the contact surface against the movable end portion.

5. The guide position adjustment device according to claim 1, wherein the outlet-side guide moving mechanism includes the motor serving as the second actuator, and a moving direction conversion mechanism for converting rotation of a rotary shaft of the motor into a moving direction in which the downstream-side end portion of the upstream-side guide member moves in the device width direction.

6. A folder gluer comprising:

the position adjustment device according to claim 1.

7. A box making machine comprising:

the folder gluer according to claim 6.

8. A folding guide position adjustment method for adjusting positions in a device width direction of an upstream-side guide member and a downstream-side guide member by a guide position adjustment device which is the guide position adjustment device according to claim 1 and further includes an inlet-side guide moving mechanism for moving the inlet-side tip regulation portion of the upstream-side guide member in the device width direction by a third actuator, the method comprising:

in a case where a length in a traveling direction of the corrugated cardboard sheet is equal to or greater than a predetermined value set in advance, translating the supporting frame inward in the device width direction by operating the first actuator and moving at least the inlet-side tip regulation portion of the upstream-side guide member outward in the device width direction by operating the third actuator, with respect to a case where the length in a traveling direction is smaller than the predetermined value, and thereafter, moving the outlet-side tip regulation portion outward in the device width direction in an inner range from a position in the device width direction of the inlet-side tip regulation portion by operating the second actuator.

9. A guide position adjustment device comprising:

an upstream-side guide member and a downstream-side guide member which are mounted in pairs to right and left on a folder gluer that folds a corrugated cardboard sheet into a box while the corrugated cardboard sheet travels in a sheet traveling direction, and which are disposed in order from an upstream side in the sheet traveling direction, wherein the guide position adjustment device is mounted on a folding guide device provided with a frame moving mechanism for translating a supporting frame, which supports the upstream-side guide member and the downstream-side guide member, in a device width direction perpendicular to the sheet traveling direction by a first actuator, the upstream-side guide member includes at least an inlet-side tip regulation portion and an outlet-side tip regulation portion of the upstream-side guide member, among tip regulation portions that come into contact with a folded portion of the corrugated cardboard sheet, and the guide position adjustment device includes an outlet-side guide moving mechanism for moving the outlet-side tip regulation portion in the device width direction with respect to the supporting frame in an inner range from a position in the device width direction of the inlet-side tip regulation portion by a second actuator, the outlet-side guide moving mechanism includes a motor which is the second actuator and is mounted on the supporting frame, and a moving direction conversion mechanism for converting rotation of a rotary shaft of the motor into a moving direction in which the downstream-side end portion of the upstream-side guide member moves in the device width direction, the second actuator is a motor, the motor being mounted on the supporting frame and moving a downstream end of the outlet-side tip regulation portion in the device width direction via a bracket provided at the downstream end of the outlet-side tip regulation portion, and the moving direction conversion mechanism includes an oscillating member which is oscillatably supported by the supporting frame and is connected to the downstream-side end portion of the upstream-side guide member, a contact surface which is provided on the oscillating member, inclined in the device width direction with respect to the sheet traveling direction, and capable of coming into contact with a movable end portion of a moving member that moves in the sheet traveling direction in conjunction with movement of the second actuator, and a biasing member that presses the contact surface against the movable end portion.

* * * * *